Figure 1:
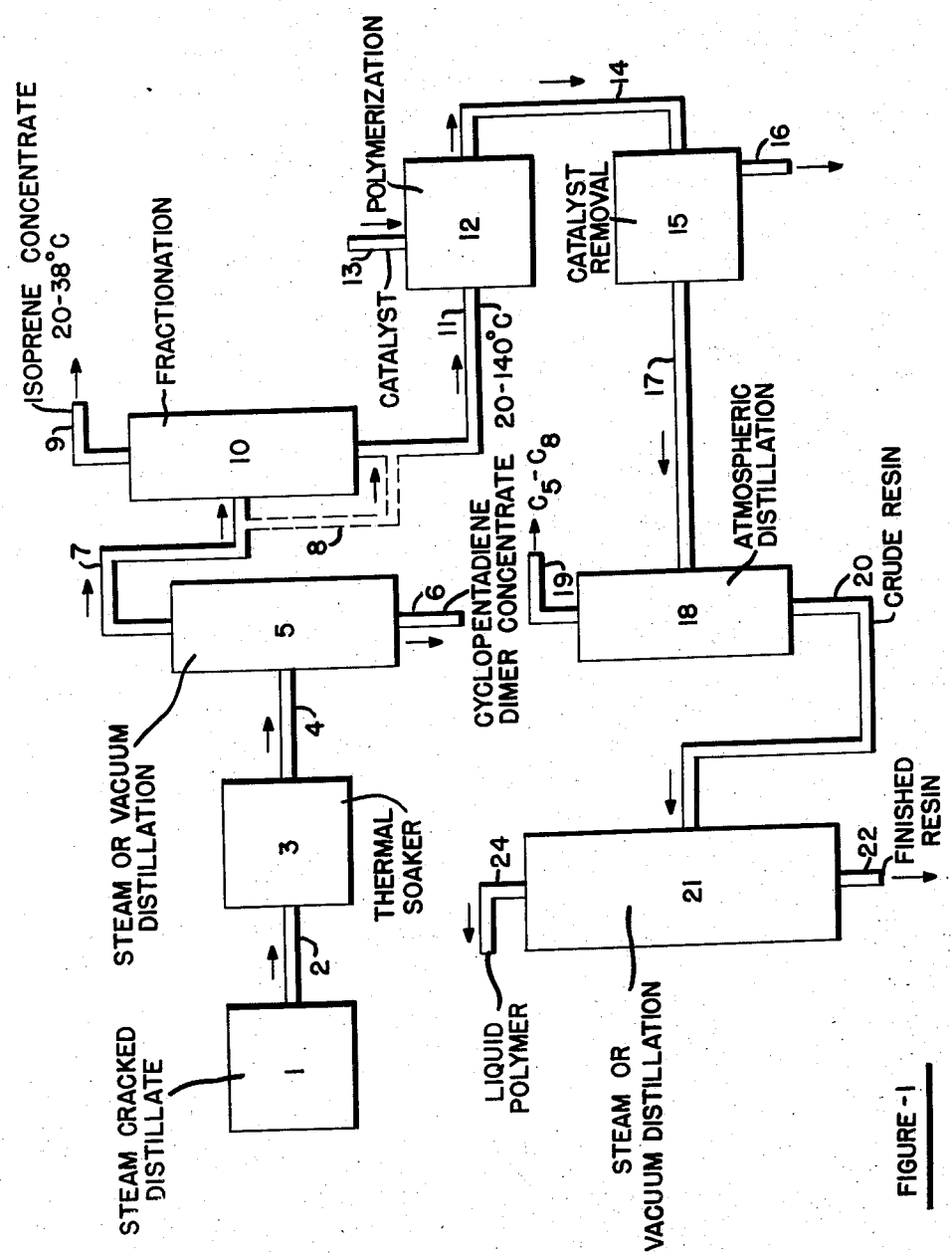

United States Patent Office 2,894,937
Patented July 14, 1959

2,894,937

PROCESS FOR PREPARING PETROLEUM RESINS II

Fred W. Banes and Joseph F. Nelson, Westfield, and Robert F. Leary, Cranford, N.J., assignors to Esso Research and Engineering Company, a corporation of Delaware Continuation of application Serial No. 318,222, November 1, 1952. This application May 1, 1956, Serial No. 581,943

1 Claim. (Cl. 260—82)

This invention is concerned with the production of light colored, high quality resins from unsaturated petroleum fractions obtained by steam cracking and, more particularly, with the production of resins from a fraction largely free of cyclic dienes and materials boiling below 38° C., including isoprene, by the use of an aluminum halide catalyst in the solid, finely divided state and slurries or solutions thereof. The polymerization process also incidentally produces fractions having relatively high aromatic content from which chemically pure components can be recovered.

Although petroleum fractions from cracking operations have previously been used for preparing resins, the improved operations of this process employ streams having controlled compositions and also use critical conditions of polymerization to give high quality, light colored resins, and at the same time, yield by-product streams which are free of sludge forming components but contain high concentrations of the desired aromatics.

The invention is of especial importance as a valuable process for the production of light colored, unsaturated resins from the highly unsaturated petroleum fractions produced by steam cracking. Preferably, the cyclic diolefins, such as cyclopentadiene and methylcyclopentadiene, are removed from a steam cracked fraction boiling substantially below $C_9$. At least 50% up to all of the isoprene containing fraction present and boiling from the initial boiling point up to 38° C. is also removed. The cyclic diolefins, including cyclopentadiene and methyl cyclopentadiene, are preferably removed by dimerization and distillation. The isoprene fraction is either completely removed or the isoprene content is adjusted by fractional distillation and/or suitable blending of streams. The resulting stream is a fraction boiling below $C_8$ or $C_9$, and is polymerized at approximately room temperature with an aluminum halide catalyst as the solid, as a slurry or in solution. Conversions of 10% to 40% of the prepared feed to resins are obtained.

These resins are light colored and have high softening points. They are of particular use in printing ink formulations, as rubber compounding ingredients, and for blending with high softening point resins in the preparation of floor tile.

Petroleum fractions such as kerosene, gas oil, naphtha, etc. are cracked in the presence of steam at temperatures above 1000° F. up to 1500° F. to give unsaturated product stream. The liquid cut boiling mostly below about $C_9$ but containing components up to $C_{14}$ is segregated and heated at about 90 to 140° C. to dimerize cyclopentadienes. Thereafter, a $C_8$ to $C_9$ and lighter liquid cut is taken overhead to separate dimer concentrates as bottoms. The overhead stream, substantially freed of cyclodienes, is then fractionated to remove at least half of the isoprene containing fraction boiling below 38° C. and is the raw material for making these superior resins.

Table I shows the preferred specifications for the resin feed streams, showing both distillation ranges and chemical composition. Table II shows the compositions of typical feed streams. Naphtha samples B, C, D, F and G are selected from within the specification limits of Table I and represent desirable feed streams for use in carrying out the invention. Stream samples A and E are representative of naphthas having undesirable characteristics for the preparation of resins.

TABLE I

*Specifications for resin feed streams*

[Boiling range 20-140° C., predominantly 30-130° C. and containing 15 Wt. percent or less boiling below 38° C. (including 3.5 Wt. percent or less isoprene on the total stream).]

| Distillation Range | (I.B.P.-38° C | 0-15 Wt. percent. |
|---|---|---|
| | 38-70° C | 25-50 Wt. percent. |
| | 70-130° C | 35-70 Wt. percent. |
| | 130°+ | <5. |
| Composition, Wt. percent: | | |
| Diolefins, Conj | 11-25 | |
| Isoprene | | 0-3.5. |
| Piperylene | | 7-12. |
| Cyclopentadienes | | 0-2. |
| Others | | 4-7.5. |
| Aromatics | 18-41 | 15-30. |
| Benzene | | 15-30. |
| Toluene | | 3-10. |
| $C_8$ Aromatics | | <1. |
| Paraffins | 0-5 | |
| Olefins | 35-70 | |

The diolefin content of this mixture was obtained by reacting a mixture of 1.5 to 3.0 ml. of sample and 2.5 ml. of chloromaleic anhydride (diluted with 2 ml. benzene containing 0.1% tertiary butyl catechol) for 3 hours at 100° C., and steam distilling the resulting reaction mixture for 2 hours to recover HCl (1 mole/mole of diolefin).

TABLE II
*Composition of typical resin feed streams*

| Naphtha | A | B | C | D | E | F | G |
|---|---|---|---|---|---|---|---|
| Distillation: | | | | | | | |
| Wt. Percent Overhead: I.B.P. to 38° C. | 29 | 13.5 | 3.5 | 3.9 | 17 | 8 | 0 |
| 38–70 | 28 | 32.5 | 39 | 39.9 | 22 | 25 | 31 |
| 70–130 | 42 | 53 | 54.5 | 52.7 | 59 | 64 | 69 |
| 130+ | 1 | 1 | 3.0 | 3.5 | 2 | 3 | <1 |
| Composition, Wt. Percent: | | | | | | | |
| Diolefins | 18.2 | 19.4 | 16.2 | 15 | 14.5 | 14 | 19 |
| Isoprene | 7.0 | 3.1 | <1 | <1 | 4.0 | <1 | <1 |
| Piperylene | 6.9 | 8.8 | 9.8 | 8.3 | 7.5 | 8.3 | |
| CPD's | 1.0 | 1.0 | 1.8 | 1.2 | 0.7 | 0.9 | <1 |
| Others | 3.3 | 6.5 | 4.6 | 3.5 | 2.3 | 4.8 | |
| Aromatics— | | | | | | | |
| Benzene | 14.5 | 19.2 | 22.1 | 19.6 | 20 | 29.1 | 30 |
| Toluene | 5.7 | 7.4 | 8.1 | 4.2 | 9 | 6.8 | 8 |
| $C_8$ Arom. | <1 | <1 | <1 | <1 | <1 | <1 | <1 |
| Paraffins | 2 | 3 | 3 | 1 | 1 | 1 | 2 |
| Olefins | 59.6 | 51 | 50.6 | 60.2 | 55.5 | 49.1 | 41 |

The selected streams are treated with an aluminum halide catalyst at about −40° to +70° C., preferably 0° to +50° C., under conditions of good agitation. The resin thus formed may be recovered by water and/or alkali washing to remove catalyst, followed by stripping off the unpolymerized material. One good way to remove the catalyst is to add methyl alcohol to form a solid complex with $AlCl_3$, which is then filtered off. However, other methods for removing the catalyst from the polymerized products may be used.

The washed resin solutions are then stripped of unreacted hydrocarbons boiling up to the end point of the feed naphtha, about 140° C. The resulting crude resin concentrate is then stripped under vacuum or with steam to remove liquid polymer and to recover a solid resin product having a softening point of 80° C. or higher. Such a resin product, for example, might be obtained by stripping to a bottoms temperature of 260 to 270° C. at a pressure of 2 to 5 mm. Hg.

The yield of liquid polymer boiling between the hydrocarbon feed naphtha and the resin is dependent on the feed composition, catalyst concentration and temperature. It is desirable that the yield of liquid polymer be held to 7% or less on the feed since it is essentially useless and represents a complete loss of feed components.

Over a catalyst concentration range of 0.5 to 5% and a temperature range of −40° to +70° C., the yield of liquid polymer is at a desirably low level provided the isoprene fractions of the feed (20–38° C. fraction) represent approximately 15% or less of the total feed.

It is to be understood that this polymerization process can be carried out either in a batch or continuous manner.

The invention is described in more complete detail by the following examples and the accompanying figures, although it is not intended to limit the scope of the invention thereto.

EXAMPLE I

A series of comparative runs were carried out using feed stock as identified in Table II. In each experiment, 500 parts of unsaturated feed was agitated at 20° to 25° C. while 5 parts of powdered $AlCl_3$ was added over a period of 30 minutes. The agitation was continued for an additional 60 minutes at 45° C. after which the reactor contents were washed with 5% $H_2SO_4$ solution and then with water at temperatures of about 50° C. The naphtha was stripped off at atmospheric pressure and the remaining crude resin was stripped to a bottoms temperature of 270° C. at 2 to 5 mm. Hg to give a light colored resin product. The data from this series of runs is tabulated in Table III below.

These data show that feeds having 13.5 wt. percent or less of the isoprene-containing fraction give resin yields of 35.2 to 37.1 wt. percent at a resin softening point of 90° C. In each case the yield of liquid polymer is low at 3.7 to 5.2%. However, the feed (A) containing more than 15% of the isoprene-containing fraction gave lower yields (31.5 to 32.2%) and also excessively high liquid polymer yields (8–10%). This latter feed also produced insoluble gel in contrast to the completely soluble products produced with feeds C and B.

The light color of these resins is also particularly desirable. They are generally of light amber color and have Gardner colors of 2 to 3.

TABLE III
*Effect of I.B.P.–38° C. concentration on liquid polymer yield*

| Feed (Table II) | C | | B | | A | | |
|---|---|---|---|---|---|---|---|
| Wt. Percent I.B.P.–38° C. Fraction | 3.5 | | 13.5 | | 29 | | |
| Wt. Percent Isoprene on Feed | <1 | | 3.1 | | 6.7 | | |
| Percent $AlCl_3$ on Feed | 0.75 | 1.0 | 0.75 | 1.0 | 0.75 | 1.0 | 1.25 |
| Resin Yield, Wt. Percent | 35.2 | 37.1 | 35.7 | 35.9 | 32.2 | 31.5 | 31.5 |
| Liquid Polymer, Wt. Percent | 4.7 | 3.7 | 5.2 | 4.9 | 8.4 | 8.8 | 10.3 |
| Gel, Wt. Percent | | | | | 1–2 | 1–2 | 1–2 |
| Resin Soft. Pt., °C.[1] | 92 | 90 | 90 | 90 | 90 | 89 | 90 |
| Color[2] | 3 | 2 | 3 | 2 | 2 | 3 | 3 |
| Iodine No.[3] | 202 | 204 | 205 | 197 | 202 | | |

[1] Ring and Ball Softening Point (ASTM E-28-51-T).
[2] Gardner color index, 1 g. resin/67 g. xylene.
[3] ASTM (D-555-47).

EXAMPLE II

A second series of experiments was carried out as shown in Table IV. The feed used was sample D of Table II to which varying amounts of the isoprene-containing fraction were added. Conditions of the polymerization and subsequent recovery were substantially the same as those shown in Example I.

As in Example I, the results show that feeds containing less than 15 weight percent of the isoprene-containing fraction give high yields of soluble products and 6.6% or less of liquid polymer. It is to be noted that, in general, as the concentration of catalyst is increased, the amount of liquid polymer also increases. At the level of about 3.0% AlCl₃ catalyst, the amount of liquid polymer is within allowable limits. Feeds containing 18% and above of the isoprene fraction gave partially insoluble resins and high amounts of liquid polymer.

resins having high qualities in every way. Low amounts of liquid polymer were also shown. Temperatures below 0° C. gave somewhat reduced yields of resin but having good qualities and accompanied by only small amounts of liquid polymer.

TABLE IV
*Addition of I.B.P.-38° C. (isoprene containing) fraction to basic feed*

| | | | | | | | | | |
|---|---|---|---|---|---|---|---|---|---|
| Feed D (Table II), Wt. Percent | 100 | 100 | 100 | 100 | 95 | 90 | 85 | 80 | 75 |
| Wt. Percent I.B.P.-38° C. | 0 | 0 | 0 | 0 | 5 | 10 | 15 | 20 | 25 |
| Total I.B.P.-38° C. Cut | 3.9 | 3.9 | 3.9 | 3.9 | 8.8 | 13.5 | 18.3 | 23.1 | 27.9 |
| Percent AlCl₃ | 1 | 1.5 | 2.0 | 3.0 | 1 | 1 | 1 | | 1 |
| Temperature | | | | | | | | | |
| Time | Catalyst added over ½ hour period at 20-25° C. Reaction mixture then agitated for one hour at 45° C. | | | | | | | | |
| Resin, Wt. Percent | 32.2 | 31.5 | 33.3 | 33.2 | 32.2 | 30.6 | 31.4 | 32.2 | 31.9 |
| Liquid Polymer, Wt. Percent | 3.8 | 4.7 | 5.3 | 6.6 | 4.8 | 5.6 | 7.1 | 7.8 | 8.1 |
| Gel, Wt. Percent | None | None | None | None | None | None | 1-4 | 1-4 | 1-4 |
| Resin: | | | | | | | | | |
| Softening Point | 90 | 87 | 90 | 90 | 86 | 89 | 90 | 90 | 91 |
| Color | 3 | 3 | 4 | 4 | 3 | 2 | 3 | 4 | 3 |
| Iodine Number | 183 | 150 | 186 | 173 | 188 | 188 | | | |

EXAMPLE III

A series of experiments was carried out to study the effect of variations in the physical form of AlCl₃ and the manner in which it is added. In this study, both 30 mesh and 100 mesh solid AlCl₃ were tested and used as catalysts. In addition, 30 mesh AlCl₃ was slurried in several different liquid media, including the polymerization reactor effluent, the polymerizate, a mixture of xylenes, and the raffinate. Details of the experiments are shown in Table V. The resulting resins were obtained in good yields and were of uniform good quality with respect to both softening point and color. The polymerization reactions showed very low amounts of the undesirable liquid polymer products.

TABLE VII
*Study of temperature effect*

| Naphtha Feed (Table II) | D | | | |
|---|---|---|---|---|
| Catalyst | AlCl₃ Powder (30 Mesh) | | | |
| Wt. Percent AlCl₃ on Feed | 1.0 | 1.0 | 1.0 | 1.0 |
| Cat. Addition Time, min | 30 | 30 | 30 | 30 |
| Temperature, °C | 45-50 | 20-25 | 0 | -40 |
| Yields, Wt. Percent on Feed: | | | | |
| Resin | 32.5 | 32.2 | 29.8 | 18 |
| Liquid Polymer | 4.3 | 3.8 | 5.2 | 5.4 |
| Resin: | | | | |
| Soft. Pt., °C | 90 | 90 | 90 | 89 |
| Color | 2 | 3 | 3 | 2 |

TABLE V
*Study of catalyst effect*

| Naphtha Feed (Table II) | B | | | | | |
|---|---|---|---|---|---|---|
| Catalyst | Powdered AlCl₃ | | Slurried 30 Mesh AlCl₃ (35% Solids) | | | |
| | 100 Mesh | 30 Mesh | Reactor Effluent | Washed Polymerizate | Xylenes | Raffinate |
| Wt. Percent AlCl₃ on Feed | 0.75 | 0.75 | 1.0 | 1.0 | 1.0 | 1.0 | 1.0 |
| Cat. Addition Time | (1) | (1) | (1) | (2) | (2) | (2) | (1) |
| Additional Agitation | (2) | (2) | (2) | (2) | (2) | (2) | (2) |
| Yields, Wt. Percent on Feed: | | | | | | | |
| Resin | 35.7 | 33.7 | 33.2 | 32.4 | 33.2 | 32.6 | 32.5 |
| Liquid Polymer | 5.2 | 5.6 | 5.4 | 5.4 | 5.6 | 5.8 | 5.5 |
| Resin: | | | | | | | |
| Soft. Pt., °C | 90 | 89 | 88 | 90 | 88 | 88 | 90 |
| Color | 4 | 4 | 2 | 3 | 3 | 3 | 3 |

¹ 30 min. at 20° C.
² 60 min. at 45° C.

EXAMPLE IV

The effects of temperature on the polymerization reaction are shown in Table VI. Aluminum chloride powder of 30 mesh was employed with a constant feed using reaction temperatures varying from −40° C. up to +50° C. Details are shown in Table VI. Temperatures of about 0° C. up to 50° C. gave uniformly high yields and

EXAMPLE V

Experiments were carried out using the aluminum halides in solution as catalysts. Both AlCl₃ dissolved in ethyl chloride and AlBr₃ dissolved in n-hexane gave excellent yields of high quality resins and relatively small amounts of liquid polymer.

The data of the experiments are shown in Table VII.

TABLE VII

*Effect of catalysts in solution*

| Feed (Table II) | E | F |
|---|---|---|
| Catalyst | $AlCl_3$ | $AlBr_3$. |
| Wt. Percent on Feed | 1.0 | 1.0. |
| Method of Addition | Ethyl Chloride Solution. | Solution in n-Hexane. |
| Reaction Temp., ° C | 20 | 20. |
| Reaction Time, min | 60 | 60. |
| Resin Yield, Wt. Percent on Feed | 26 | 25.8. |
| Soft. Pt., ° C | 82 | 90. |
| Color | 3 | 3. |
| Iodine Number | 205 | 208. |
| Wt. Percent Liquid Polymer | | 3.2. |

EXAMPLE VI

Table VIII shows that the aluminum halides, specificially $AlCl_3$ and $AlBr_3$, are in every case greatly superior to $BF_3$ as catalysts for producing high quality resins. The $BF_3$ catalyst gives resin having much lower softening point and much higher unsaturation as shown by the iodine number values. Also, the $BF_3$ catalyst gives approximately three times as much of the undesirable liquid polymer as does the aluminum halide catalyst.

Details are shown in Table VIII.

TABLE VIII

*Comparison of aluminum halides with $BF_3$*

| Feed (Table II) | F | | | | | G |
|---|---|---|---|---|---|---|
| Catalyst / Weight Percent on Feed / Method of Addition | $AlCl_3$ 1.0 30 Mesh Powder | | $AlCl_3$ 1.0 10% Slurry in n-Hexane | $AlBr_3$ 1.0 Solution in n-Hexane | $BF_3$ 1.0 Gas | $AlCl_3$ 1.0 30 Mesh Powder |
| Reaction Temperature, ° C | 20 | 100 | 25.5 | 20 | 30-35 | 25 |
| Reaction Time, min | 60 | 60 | 60 | 60 | 60 | 60 |
| Resin Yield, Wt. Percent on Feed | 27.7 | 19.4 | 25.5 | 25.8 | 25 | 26.4 |
| Softening Point, ° C | 90 | 60 | 86 | 90 | 44 | 89 |
| Color | 3 | 4 | 2 | 3 | 2 | 4 |
| Iodine Number | 215 | ------- | -------- | 208 | 259 | 214 |
| Wt. Percent Liquid Polymer | 5.2 | ------- | 4.7 | 3.2 | 13.4 | 4.4 |

EXAMPLE VII

To illustrate one embodiment of the invention in a schematic manner, Figure 1 is presented. A steam cracked distillate of boiling range 20 to 140° C. is taken from storage 1 via line 2 to a thermal soaker 3 in which a temperature of 90° to 140° C. is maintained. Following this thermal treatment to convert the cyclic dienes to dimers, the mixture is removed via line 4 and subjected to a steam or vacuum distillation tower 5 from which the cyclopentadiene dimers are removed as a concentrate stream 6. Either a part of all of the undimerized portion, $C_5$–$C_8$, is passed as stream 7 to a fractionation tower 10, from which an isoprene containing fraction boiling from 20 to 38° C. is removed as an overhead stream 9. To adjust isoprene content in the polymerization zone, a part of stream 7 can bypass tower 10 via line 8 and go directly to polymerization reactor 12. A stream boiling from 20 to 140° C. is taken from the lower portion of tower 10 and passed by line 11 to polymerization reactor 12. The $AlCl_3$ catalyst is added via inlet 13. The olefinic feed stream is subjected to polymerization in reactor 12 at temperatures of from 0 to 60° C. The polymerized reaction mixture is passed by line 14 through a catalyst removal zone 15 from which catalyst is removed by line 16. The polymerized stream 17 is taken to an atmospheric distillation tower 18. From this distillation tower 18, a $C_5$–$C_8$ overhead stream 19 is removed and can be utilized for isolating aromatic components and the like. A crude resin fraction 20 is passed to a distillation tower 21 equipped for steam and/or vacuum distillation from which a small amount of liquid polymer is removed as overhead stream 24 and the finished resin product is removed from the bottom portion as stream 22. The process may be operated either batchwise or in a continuous manner.

EXAMPLE VIII

Figure 2:
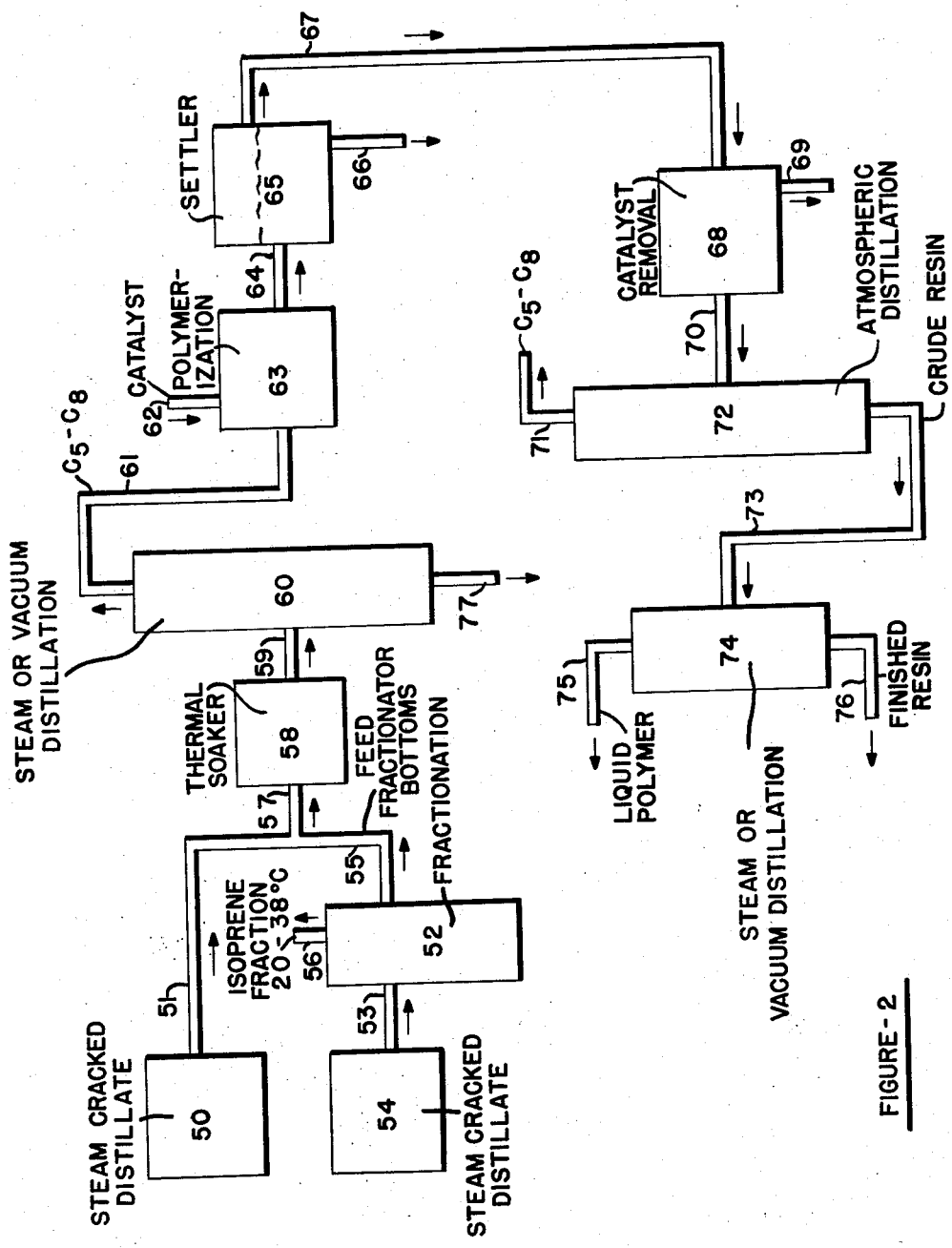

In a second embodiment, shown schematically in Figure 2, the invention is carried out according to the following description. The polymerization, using an $AlCl_3$ catalyst, is used as a means not only for separating relatively pure chemical fractions and for preparing an aromatic extraction feed stock but also as a means of preparing useful and valuable resins using either $AlCl_3$ or $AlBr_3$ catalyst.

The polymerization process involves the addition of $AlCl_3$ or $AlBr_3$ catalyst to an unsaturated distillate from steam cracking operations from which the the cyclopentadienes have been largely removed and which has been adjusted as to content of the isoprene containing fraction boiling from 20 to 38° C. The steam cracked distillate streams 51 and 53 from steam cracking sources 50 and 54 either may or may not be subjected to a distillation tower 52 to remove an isoprene containing stream 56, thereby allowing any desired amount of the I.B.P.–38° C. isoprene fraction to remain in combined stream 57. Streams 51 and 55 are combined as stream 57 and taken to a thermal soaker 58 for dimerization at 90° to 140° C. The stream 59 from the thermal soaker 58 is passed to distillation tower 60 by line 59 to remove a dimer stream 77 as a bottoms fraction, and an overhead stream of $C_5$–$C_8$ olefins as stream 61 which is passed to the polymerization reactor 63. The amount of $AlCl_3$ catalyst added by line 62 represents 0.5 to 5.0 weight percent on the feed and is used in amounts that are necessary to convert from 10% to 50%, and preferably 15 to 35%, of the olefinic hydrocarbon feed material to resins. This polymerization can be carried out as a batch or continuous process at temperatures in the range of −40 to +70° C. In either operation, the reaction mixture from the polymerization step is passed by line 64 and is sent to a settler 65 to separate any insoluble products or catalyst complexes (if formed) as stream 66. The supernatent layer from settler 65 is then sent as stream 67 to a catalyst removal unit 68 for removing any residual catalyst as stream 69. This catalyst removal may be accomplished in a number of ways e.g. water or caustic washing, precipitation of a $CH_3OH$—$AlCl_3$ complex followed by filtration, adsorption of active catalyst on a solid basic material, etc.

The polymerization reaction product, freed of catalyst, is next taken by line 70 to an atmospheric distillation tower 72 and stripped to remove unreacted hydrocarbon material, $C_5$–$C_8$, boiling below about 130° C., as stream 71 and the crude resin is taken by line 73 to column 74 where it is stripped further with steam or inert gas or under vacuum to remove low molecular weight liquid polymer products or small quantities of materials boiling above the $C_8$ range that were present in the polymerization feed. These light materials are removed overhead as stream 75, while the finished resin is removed as bottoms stream 76. One such finishing operation is a flash distillation under vacuum to a bottoms (resin) temperature of 250 to 270° C. at 2 to 4 mm. Hg, to give finished resin 76.

The resins produced as described above are light colored products having softening points above 80° C. and up to 120° and above, and usually represent yields of 15 to 35% on the hydrocarbon feed. Examples of the preparation and properties of such resins are given in the tables of the foregoing examples.

This application is a continuation of Ser. No. 318,222, filed November 1, 1952, now abandoned.

The nature of the present invention having been thus fully set forth and specific examples of the same given, what is claimed as new and useful and desired to be secured by Letters Patent is:

In a process for the preparation of improved petroleum resins, the combination which comprises isolating a steam cracked hydrocarbon petroleum fraction boiling between about 20 and 140° C., heating said steam cracked fraction to a temperature sufficient to dimerize substantially all cyclodienes, stripping the resulting mixture to a temperature sufficient to separate an overhead product from the dimerized cyclodienes, said overhead product containing more than 3.5 wt. percent isoprene, fractionating said overhead product to reduce the isoprene content to below about 3.5 wt. percent, recovering a fraction reduced in isoprene content and having the following distillation analysis and composition:

Distillation

| | Weight percent |
|---|---|
| I.B.P.–38° C. | 0–15 |
| 38–70° C. | 25–50 |
| 70–130° C. | 35–70 |
| 130°+ | <5 |

Composition

| | |
|---|---|
| Diolefins, Conj. | 11–25 |
|   Isoprene | 0–3.5 |
|   Piperylene | 7–12 |
|   Cyclopentadienes | 0–2 |
|   Others | 4–7.5 |
| Aromatics | 18–41 |
|   Benzene | 15–30 |
|   Toluene | 3–10 |
|   $C_8$ aromatics | <1 |
| Paraffins | 0–5 |
| Olefins | 35–70 | and polymerizing said latter fraction in the presence of an aluminum halide catalyst at a temperature between −40 to +70° C. to produce a resinous product.

References Cited in the file of this patent

UNITED STATES PATENTS

| | | |
|---|---|---|
| 1,982,708 | Thomas et al. | Dec. 4, 1934 |
| 2,734,046 | Nelson et al. | Feb. 7, 1956 |
| 2,753,325 | Banes et al. | July 3, 1956 |
| 2,753,326 | Hamner | July 3, 1956 |
| 2,754,288 | Banes at al. | July 10, 1956 |
| 2,764,577 | Hubbard et al. | Sept. 25, 1956 |
| 2,775,575 | Hamner et al. | Dec. 25, 1956 |
| 2,775,576 | Hamner et al. | Dec. 25, 1956 |

OTHER REFERENCES

Thomas et al. (II), Ind. Eng. Chem., 24, 1125–1128 (1932).